United States Patent
Oz et al.

[11] Patent Number: 5,444,461
[45] Date of Patent: Aug. 22, 1995

[54] BI-DIMENSIONAL VISUAL MODEL

[75] Inventors: Ran Oz, Herzliya; Yehuda Elmaliah, Petah Tikva; Doron Herzlich, Ramat Hasharon, all of Israel

[73] Assignee: Optibase Advanced Systems (1990) Ltd., Herzliya, Israel

[21] Appl. No.: 853,951

[22] Filed: Mar. 19, 1992

[51] Int. Cl.⁶ .............................................. G09G 1/28
[52] U.S. Cl. .................................. 345/154; 345/199
[58] Field of Search ............. 340/703, 701, 728, 731, 340/793, 812; 358/75, 80, 81, 461, 463, 456, 455, 457; 345/136, 199, 137, 138, 154, 153; 348/111

[56] References Cited

U.S. PATENT DOCUMENTS

| | | | |
|---|---|---|---|
| 4,897,799 | 1/1990 | Le Gall et al. | 340/812 |
| 4,920,501 | 4/1990 | Sullivan et al. | 358/457 |
| 5,003,299 | 3/1991 | Batson et al. | 340/703 |
| 5,040,128 | 9/1991 | Yamaguchi | 340/703 |
| 5,054,100 | 10/1991 | Tai | 340/728 |
| 5,124,688 | 6/1992 | Rumball | 340/703 |
| 5,130,701 | 7/1992 | White et al. | 345/153 |
| 5,172,247 | 12/1992 | Ghaderi | 358/461 |
| 5,181,014 | 1/1993 | Dalrymple et al. | 340/703 |
| 5,191,406 | 3/1993 | Brandestini et al. | 348/111 |
| 5,204,665 | 4/1993 | Bollman et al. | 340/703 |

*Primary Examiner*—Tommy P. Chin
*Assistant Examiner*—A. Au
*Attorney, Agent, or Firm*—Blakely, Sokoloff, Taylor & Zafman

[57] ABSTRACT

A system and method for converting true-color still images to a format used by graphics display boards which is based on a pseudo-color method (i.e., displays such as Super VGA used by IBM personal computers and compatibles capable of displaying only 256 colors). The resulting visual model emulates thousands of colors displaying richly colored images and delivering a much better result than technologies based on currently used techniques such as the common histogram method. The high quality is obtained by determining an error factor for each pixel. In a preferred embodiment, the 256 colors are determined by a selection process which specifies a universal palette which contains an optimum set of colors for all images, i.e., without using a histogram which determines the colors which appear most frequently in a single particular image.

5 Claims, 6 Drawing Sheets

Fig. 1a

PRIOR ART

Fig. 1b

| K=20..78 | K=79..137 | K=138..196 | K=197..255 |
|---|---|---|---|
| R G B | R G B | R G B | R G B |
| 18 33 56 | 129 41 61 | 172 120 147 | 215 199 232 |
| 39 23 56 | 82 102 141 | 193 109 147 | 236 188 232 |
| 60 12 56 | 103 91 141 | 130 137 126 | 255 177 232 |
| 81 1 56 | 124 80 141 | 151 126 126 | 194 205 211 |
| 18 29 35 | 145 69 141 | 172 116 126 | 215 195 211 |
| 39 19 35 | 82 97 120 | 193 105 126 | 236 184 211 |
| 60 8 35 | 103 87 120 | 146 166 205 | 255 173 211 |
| 81 0 35 | 124 76 120 | 167 155 205 | 194 201 190 |
| 18 25 13 | 145 65 120 | 188 144 205 | 215 190 190 |
| 39 14 13 | 82 93 99 | 209 133 205 | 236 180 190 |
| 60 4 13 | 103 83 99 | 146 161 184 | 255 169 190 |
| 81 0 13 | 124 72 99 | 167 151 184 | 210 230 255 |
| 34 54 93 | 145 61 99 | 188 140 184 | 231 219 255 |
| 55 43 93 | 82 89 77 | 209 129 184 | 252 208 255 |
| 76 32 93 | 103 78 77 | 146 157 163 | 255 197 255 |
| 97 21 93 | 124 68 77 | 167 147 163 | 210 225 248 |
| 34 49 72 | 145 57 77 | 188 136 163 | 231 215 248 |
| 55 39 72 | 98 118 157 | 209 125 163 | 252 204 248 |
| 76 28 72 | 119 107 157 | 146 153 142 | 255 193 248 |
| 97 17 72 | 140 96 157 | 167 142 142 | 210 221 227 |
| 34 45 51 | 161 85 157 | 188 132 142 | 231 211 227 |
| 55 35 51 | 98 113 136 | 209 121 142 | 252 200 227 |
| 76 24 51 | 119 103 136 | 162 182 221 | 255 189 227 |
| 97 13 51 | 140 92 136 | 183 171 221 | 210 217 206 |
| 34 41 29 | 161 81 136 | 204 160 221 | 231 206 206 |
| 55 30 29 | 98 109 115 | 225 149 221 | 252 196 206 |
| 76 20 29 | 119 99 115 | 162 177 200 | 255 185 206 |
| 97 9 29 | 140 88 115 | 183 167 200 | 226 246 255 |
| 50 70 109 | 161 77 115 | 204 156 200 | 247 235 255 |
| 71 59 109 | 98 105 93 | 225 145 200 | 255 224 255 |
| 92 48 109 | 119 94 93 | 162 173 179 | 255 213 255 |
| 113 37 109 | 140 84 93 | 183 163 179 | 226 241 255 |
| 50 65 88 | 161 73 93 | 204 152 179 | 247 231 255 |
| 71 55 88 | 114 134 173 | 225 141 179 | 255 220 255 |
| 92 44 88 | 135 123 173 | 162 169 158 | 255 209 255 |
| 113 33 88 | 156 112 173 | 183 158 158 | 226 237 243 |
| 50 61 67 | 177 101 173 | 204 148 158 | 247 227 243 |
| 71 51 67 | 114 129 152 | 225 137 158 | 255 216 243 |
| 92 40 67 | 135 119 152 | 178 198 237 | 255 205 243 |
| 113 29 67 | 156 108 152 | 199 187 237 | 226 233 222 |
| 50 57 45 | 177 97 152 | 220 176 237 | 247 222 222 |
| 71 46 45 | 114 125 131 | 241 165 237 | 255 212 222 |
| 92 36 45 | 135 115 131 | 178 193 216 | 255 201 222 |
| 113 25 45 | 156 104 131 | 199 183 216 | 242 255 255 |
| 66 86 125 | 177 93 131 | 220 172 216 | 255 251 255 |
| 87 75 125 | 114 121 109 | 241 161 216 | 255 240 255 |
| 108 64 125 | 135 110 109 | 178 189 195 | 255 229 255 |
| 129 53 125 | 156 100 110 | 199 179 195 | 242 255 255 |
| 66 81 104 | 177 89 110 | 220 168 195 | 255 247 255 |
| 87 71 104 | 130 150 189 | 241 157 195 | 255 236 255 |
| 108 60 104 | 151 139 189 | 178 185 174 | 255 225 255 |
| 129 49 104 | 172 128 189 | 199 174 174 | 242 253 255 |
| 66 77 83 | 193 117 189 | 220 164 174 | 255 243 255 |
| 87 67 83 | 130 145 168 | 241 153 174 | 255 232 255 |
| 108 56 83 | 151 135 168 | 194 214 253 | 255 221 255 |
| 129 45 83 | 172 124 168 | 215 203 253 | 242 249 238 |
| 66 73 61 | 193 113 168 | 236 192 253 | 255 238 238 |
| 87 62 61 | 130 141 147 | 255 181 253 | 255 228 238 |
| 108 52 61 | 151 131 147 | 194 209 232 | 255 217 238 |

Fig. 2: The color table which is loaded to the display board.

BI-DIMENSIONAL VISUAL MODEL

BACKGROUND OF THE INVENTION

Figure 1A:
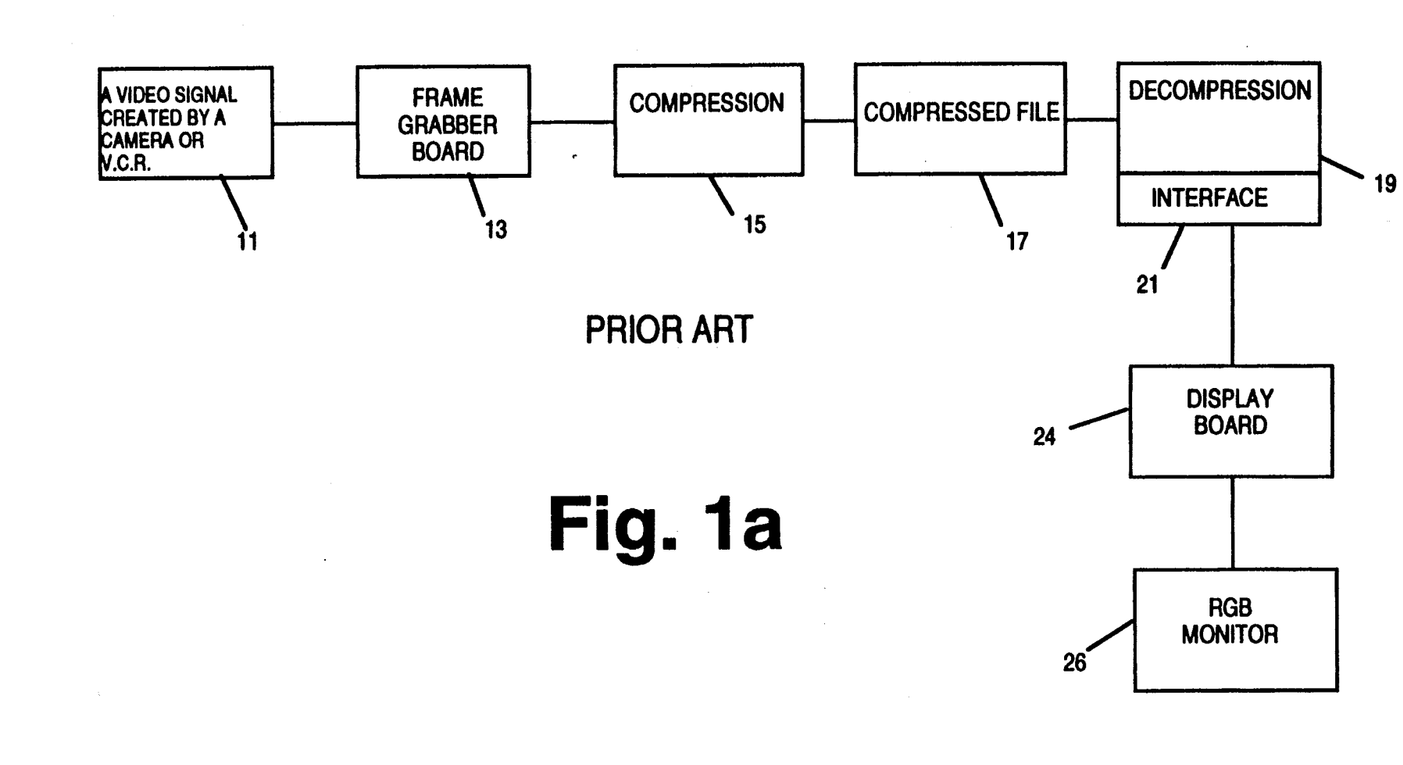
FIG. 1a is a block overview diagram of a prior art system for converting a color still or moving image to a true color digitized image which is compressed, decompressed and displayed using a 24 bit card and RGB monitor.

The present invention is directed to the processing of digitized true color information wherein each pixel to be displayed is represented by three color planes (red, blue and green) with each plane having 8 bits for 24 bits systems or 5 bits for 16 bit systems. Referring to FIG. 1a, the original analog color image 11, which is a single still image is digitized, using, for example, a camera or 24 bit scanner 13 having a resolution of typically between 75–2400 dpi. The digitized true color image may then be compressed 15 according to a compression algorithm, e.g., the JPEG standard for still images, into a compressed file reduced up to 100 to 1 by JPEG and stored as a file 17 for later processing. If the output from the scanner is compressed, it must first be decompressed 19 for further processing. In the prior art, the image is passed by interface 21 to a 16 bit or 24 bit display board 24 directly connected to interface 21 which processes the signal and displays it on an RGB monitor 26. The specifics of interface 21 depend upon the 16 or 24 bit display board utilized, the details of which are well known to persons skilled in the field of the invention.

A still digital image is a large number of pixel lines forming a matrix of rows and columns where each element is a pixel. The pixel value is a number that defines the color of the pixel, according to a dictionary known to the graphics display board.

The number of bits allocated to each of these values (the picture depth) directly determines the quality of the image. In other words, the more bits used to represent the pixel value, the larger the number of colors output simultaneously to the screen.

For example, if the depth of an image is a single bit, each pixel can have one of two values only —0 and 1. If, for instance, black is defined to be 0 and white is defined to be 1, as is the case for facsimile methodologies, only bi-level images can be produced.

Systems based on gray scale images, where the image depth is 8 bits, can display 256 levels of gray simultaneously, with 0 representing black and 255 ($FF_{16}$) representing white.

In systems based on true-color images, pictures consist of three spaces—R (red), G (green), B (blue)—where the depth of each is 8 bits (that is, each pixel is characterized by three 8-bit values), with 255 ($FF_{16}$) representing red, green or blue (or white if each of R, B and G is 255) and 0 representing no color (i.e., black if each of R, B and G is 0). The number of colors that can be simultaneously displayed in a 24 bit true color picture is $2^{24}$—some 16 million colors. In a 16 bit true color system wherein each of the three spaces R, B and G is represented by 5 bits, the total number of colors that can be displayed simultaneously is $2^{15}$ or some 33,000 colors.

Color images can also be displayed by another method known as the pseudo-color method. This method displays, for each pixel, a color from a reduced table or palette. Thus, instead of picking one from among approximately 16 million possible colors or 33,000 possible colors, the pseudo color method allows choosing 256 colors from a much larger set of colors. However, the display (of an image, of a number of images or a moving picture sequence) is limited to 256 colors only.

The prior art solution for converting a true color image to a pseudo color image is performing a statistical process on the image—called a histogram—that determines the 256 colors which most frequently appear in an image. Any other color in the picture is represented by one of these 256 possibilities. The histogram process determines, for each image, a table containing the 256 most frequently used colors.

The histogram method does not allow displaying more than one image at a time without affecting the image's optimal color table.

SUMMARY OF THE INVENTION

The present invention is a bi-dimensional visual model which converts true-color still images to very high quality VGA format pictures. It accomplishes the high quality by determining an error factor for each pixel. A portion of the error is diffused among the neighboring pixels. Images scanned in a true-color system (24 or 16 bits per pixel) are converted to a pseudo-color images using just 256 colors. In a preferred embodiment, the 256 colors are determined by a selection process which specifies a universal palette which contains an optimum set of colors for all images, i.e., without using a histogram which determines the colors which appear most frequently in a single particular image.

BRIEF DESCRIPTION OF THE DRAWINGS

FIG. 2 is a color table showing for RGB values from 20 to 255.

DETAILED DESCRIPTION OF THE INVENTION

The invented method is capable of displaying still images in pseudo-color systems, usable by Super VGA boards and the like.

In a preferred embodiment, images are displayed through a single look-up table. That is, all of the images or image sequences are displayed through the same look-up table which is not changed during the output process. The single look-up table is independent of the displayed images or their type and, therefore, can be used to display a large number of completely different images without having to obtain a histogram for each image.

The process includes adapting the image obtained from a color table so as to achieve excellent visual quality by applying an "error-diffusion" to the image. The error diffusion is carried out throughout the entire picture, pixel by pixel as described below.

Figure 1B:
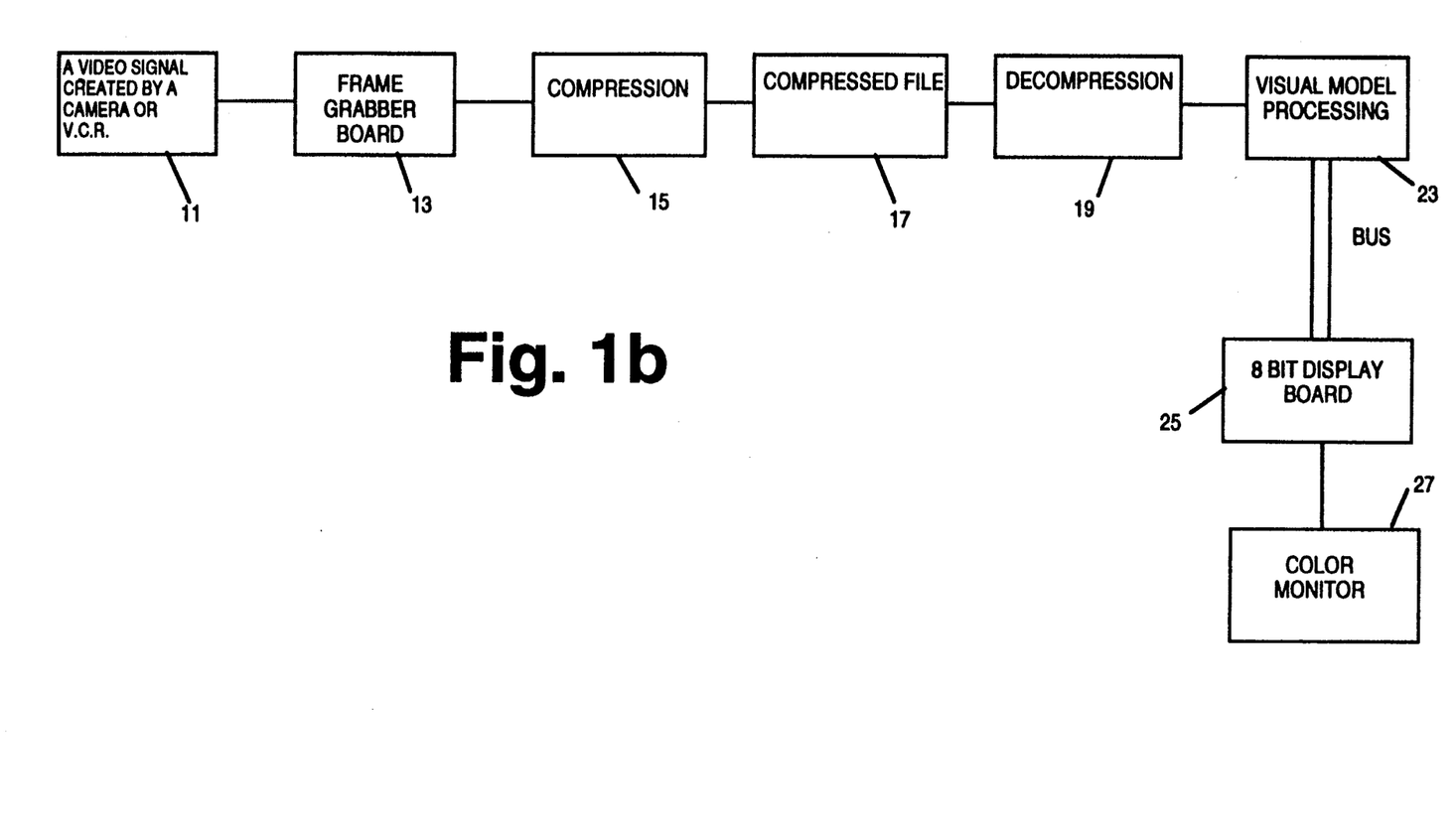
FIG. 1b is a block overview diagram of a system for converting a true color analog still or moving image to a pseudo color digitized image which is compressed, decompressed and displayed using an 8 bit display card and color monitor.

FIG. 1b shows a system in which the present invention, represented by visual model processing block 23, is utilized.

The input is a still true-color image. Each pixel is described by three numbers according to the color space it belongs to. The color space may be R, G, B or Y, U, V or Y, I, Q or any other format.

The output is an image where each pixel is defined by a color index from the 256 color palette which it represents wherein each pixel has an error diffusion factor applied to it.

The following is a detailed description of:
1. The selection process for obtaining the universal color palette.
2. The error-diffusion process for bi-dimensional error diffusion - still images.

THE SELECTION PROCESS

In order to locate the optimal color table an orthogonal color space designated by the inventor as Y.I.P. is defined as follows:

$$\begin{bmatrix} Y \\ I \\ P \end{bmatrix} = \begin{bmatrix} 0.299 & 0.587 & 0.114 \\ 0.596 & -0.274 & -0.322 \\ 0.211 & -0.253 & 0.312 \end{bmatrix} * \begin{bmatrix} R \\ G \\ B \end{bmatrix}$$

For the Y, U, V color space, the Y.I.Q. color space or other similar color space, Y, I, P is calculated in a similar manner which would be apparent to persons skilled in the art in view of the known mathematical relationships between such other color spaces and the RGB color space.

The conversion matrix above shows the valid range of possible Y.I.P. values for the R, G, B color space as follows:

$0 < Y < 255 \ [0 < R, G, B < 255]$     1

$-152 < I < 152$     2

$-64 < P < 133$     3

The valid range of possible Y, I, P values for the Y,U,V and Y, I, Q color spaces are determined from their respective color matrices.

One of the reasons that led to the selection of the Y.I.P. space is that only in this space it is possible to define a box, which includes all of the 256 colors which have been determined through simulation testing to yield optimal results. In general, acceptable results are obtained so long as each element of the conversion matrices defined above is approximately +/−0.01 the values shown.

The dimensions of the box which includes the 256 colors are very significant. On one hand, it is important to define a box as large as possible to accommodate as many different colors as possible. On the other hand, it is important to define it small enough, to allow for the selection of the 256 most probable colors.

Another reason for choosing the Y.I.P. space is its orthogonality. This means each axis can be worked on independently without affecting the other two. This fact is of crucial importance in the error diffusion process which is explained below.

Simulations and checks on various image types have been performed, and a color box optimal to the human eye which contains the colors that appear most frequently in images has been determined. The colors that appear less frequently are truncated.

All colors that are excluded from the box are truncated and do not find expression in the selected palette.

The edges of the selected box are parallel to the edges of the Y.I.P. orthogonal space. The following segments define the box edges:

$0 < Y < 255$     1

$-96 < I < 96$     2

$-16 < P < 80$     3

The box which has been defined, although smaller than the entire Y.I.P. space, still contains an infinite number of colors. The next step is selecting the 256 colors from this box which constitute the invented look-up table.

Based on simulations and trials, the solution that has been determined to provide the best results is the following:

Divide the edge which is parallel to the Y axis into 16 segments.

Divide the edges that are parallel to the I and P components into four segments each.

By joining the lines that separate the segments, a division of the greater box into 256 smaller boxes is obtained, each containing an infinite number of colors. But only one color in each small box is selected to be a value in the invented look-up table—the center of each small box. That is, assume, for example, that the value to be determined is the small box at Y[0 ... 16), I[48 ... 96), P[−16 ... 8) (where the representation [x ... y) means all values between and including x to, but not including, y). The color for all colors within this box is defined by the color at Y(8), I(72), P(−4).

If the index value of each color in the look-up table is K, and K varies between 0 and 255, then each and every color is defined by three numbers: $Y_K$, $I_K$, $P_K$.

The color table shown in FIG. 2 contains the three values—$R_K$, $G_K$, $B_K$—of each color as loaded into a display board 25 adapted to be plugged into an personal computer, workstation, or other system having the capability of displaying upto 256 colors simultaneously. The conversion from $Y_K$, $I_K$, $P_K$ to $R_K$, $G_K$, $B_K$ is carried out by inverting the R, B, G conversion matrix defined above. Since conversion to the R, G, B color space from the Y, U, V or Y, I, Q color space is a simple and well known mathematical operation, the color table shown in FIG. 2 can be easily converted to such other color spaces.

The table starts at index K=20 and continues up to K=255, since in most existing systems upto the first 20 colors are used by the system itself (in the conversion process all indices from 0 to 19 are mapped as black).

THE ERROR DIFFUSION PROCESS

The process described above is an algorithm applied to an image before being displayed through the color look-up table.

Each pixel in the image, its format notwithstanding, is converted to the Y.I.P. format, as described above.

The calculated values are truncated so as to be associated with a value included in the previously defined box, which yields the pixel values $Y_P$, $I_P$, $P_P$.

In order to find a color that best represents the three values above, each value passes through three linear quantizers as shown in Table I.

| Y QUANTIZER | | |
|---|---|---|
| $Y_P$ range | $Y_K$ | 4-bit index |
| [0..16) | 8 | 0000 |
| [16..32) | 24 | 0001 |
| [32..48) | 40 | 0010 |
| [48..64) | 56 | 0011 |
| [64..80) | 72 | 0100 |
| [80..96) | 88 | 0101 |
| [96..112) | 104 | 0110 |
| [112..128) | 120 | 0111 |
| [128..144) | 136 | 1000 |
| [144..160) | 152 | 1001 |
| [160..176) | 168 | 1010 |
| [176..192) | 184 | 1011 |
| [192..208) | 200 | 1100 |
| [208..224) | 216 | 1101 |
| [224..240) | 232 | 1110 |
| [240, 256) | 248 | 1111 |

| I QUANTIZER | | |
|---|---|---|
| $I_P$ range | $I_K$ | 2-bit index |
| [−96, −48) | −72 | 00 |
| [−48, 0) | −24 | 01 |
| [0, 48) | +24 | 10 |
| [48, 96) | +72 | 11 |

| P QUANTIZER | | |
|---|---|---|
| $P_P$ range | $P_K$ | 2-bit index |
| [−16, 8) | −4 | 00 |
| [8, 32) | +20 | 01 |
| [32, 56) | +44 | 10 |
| [56, 80) | +68 | 11 |

The 4 bits from the Y quantizer are concatenated with the 2 bits from the I quantizer and the 2 bits from the P quantizer to yield an 8 bit value for K. The selected K index represents the number of the small box that contains the $Y_P$, $I_P$, $P_P$ color.

The passing through the linear quantizers causes an error in each of the components defined as follows:

$$\text{Error\_Y} = Y_P - Y_K$$

$$\text{Error\_I} = I_P - I_K$$

$$\text{Error\_P} = P_P - P_K$$

In order to achieve the best display results for the human eye, the method takes the error into account and, in the bi-dimensional case, that is, in still images, distributes it among the pixels that are in the vicinity of the one in question.

Figure 3:
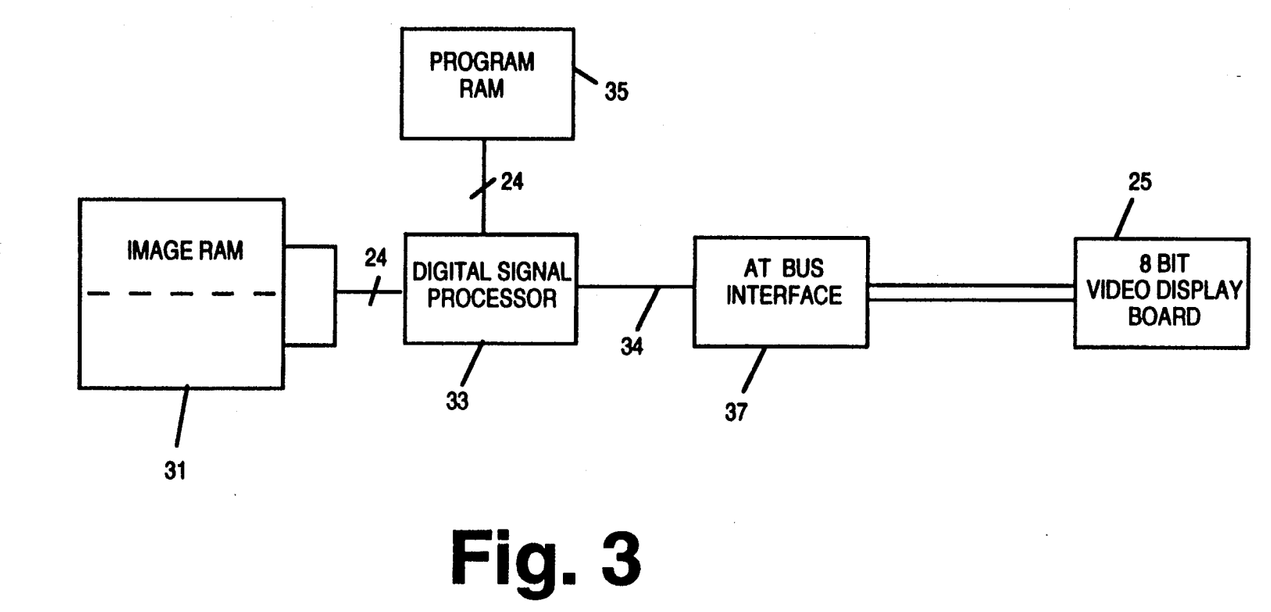
FIG. 3 is a block diagram showing the elements utilized by visual model processing 23.

Referring to FIG. 3, image RAM 31 contains a digital true color image (original or decompressed) to be displayed, a digital signal processor, such as a DSP56000 manufactured by MOTOROLA. The digital signal processor, under control of a program in program RAM 35 performs the error diffusion processing described below and creates a pseudo color image which is passed over bus 34.

BI-DIMENSIONAL ERROR DIFFUSION

In the prior art, with 256 color palettes, a dithering process is often used to smooth out the displayed colors in an attempt to yield a more pleasing to the eye display. However, dithering simply adds a random noise value to each pixel.

Figure 4:
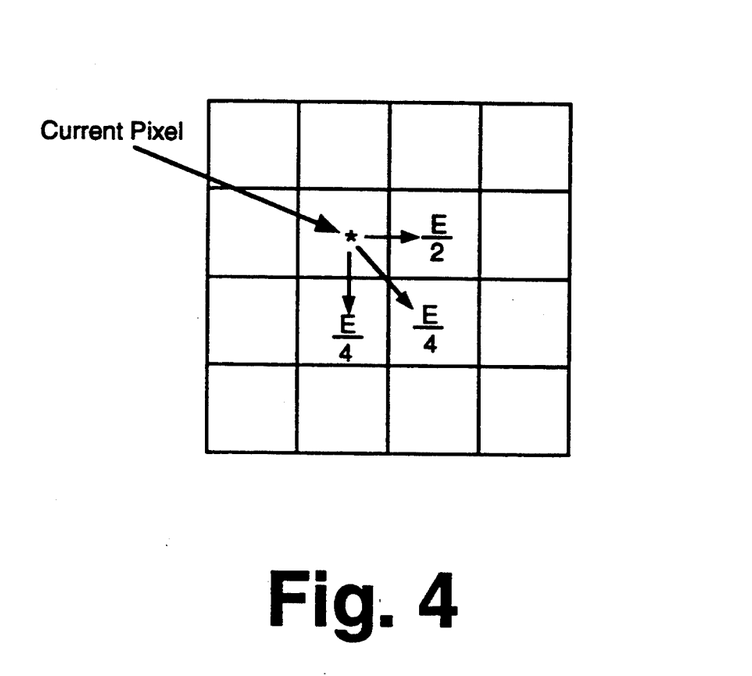
FIG. 4 is a pictorial representation of the processing used to calculate error diffusion for the bi-dimensional visual model.

In the bi-dimensional case (a single image) of the present invention, the error is distributed among the nearby pixels, as shown in FIG. 4 where E represents the error for each of the three color components of the pixel (i.e., Error_Y, Error_I and Error_P) determined by taking the difference between the true color ($Y_P$, $I_P$ and $R_P$) and the pseudo color obtained using the color palette ($Y_K$, $I_K$ and $P_K$). The distribution for the three neighboring pixels is carried out for each component such that half of the error for each component is added to the three components of the pixel to the right. A quarter of the error for each component is added to the three components of the pixel below and the three components of the pixel to the latter's right.

The portion of the error passed onto the neighboring pixel's components are translated into their color space. The new image is created by the system scanning the original image sequentially, pixel by pixel and line after line. The "corrected" pixels, that is, those that carry the error passed by previous pixels are themselves subjected to the same process at a corresponding stage where their subsequent pixels are processed.

As a result of the error diffusion process, the image looks to the human eye to have a higher resolution, notwithstanding that the screen displays 256 colors only.

Figure 5:
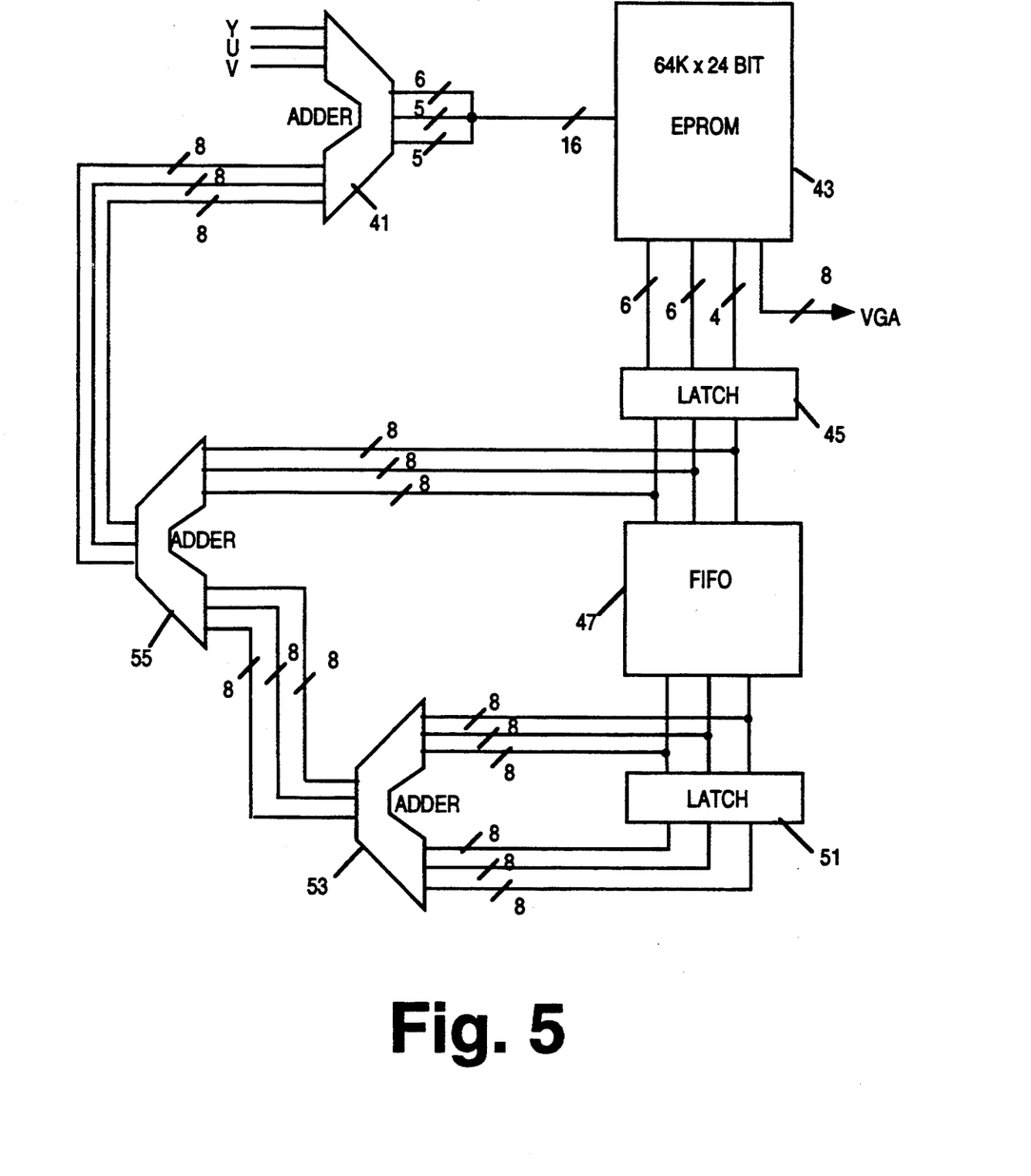
FIG. 5 is a diagram of an implementation for the bi-dimensional visual model in real time.

FIG. 5 is a block diagram of a circuit for implementing the bi-dimensional visual model in real time. It comprises adder 41, EPROM 43. latch 45, FIFO 47, latch 51 and adders 53 and 55. It should be noted that although only one of each of the foregoing elements shown, there exists three of each of the elements except for EPROM 43, one for each color component in the Y, U, V color space. (It should be noted that changes for use in other color spaces would be readily apparent to persons skilled in the art since other commonly utilized color spaces, such as R, G, B, are obtained from the Y, U, V color space by simple and well known mathematical relationships.) The pixel values are input to adder 41 along with errors from the previous pixels, if any. The sum for each of the Y, U and V components is obtained and the 6 most significant bits of the Y component along with the 5 most significant U and V components are combined to form a 16 bit address used to access EPROM 43. Although the error for each component could be calculated for the full 8 bits of each component as described above, in one embodiment of the invention, a look-up table stored in EPROM 43 is used instead. The reason only 16 bits from adder 41 are utilized is that the full 24 bits would require a much larger EPROM (i.e., $2^{24} \times 24$ bits instead of $2^{16} \times 24$ bits) to store all possible results. Further, it has been determined that the least significant 2 bits from the Y component, 3 bits from the U component and 2 bits from the V component do not add significantly to the displayed image which can be seen by the human eye. The look-up table simply stores the colors from the universal palette, the Y component error, the U component error and the V component error for all possible combinations for the 16 bit values calculated in advance and stored in the EPROM. The output from the EPROM, i.e., the 24 bit word addressed by the 16 bit output of adder 41 is the V error component divided by 2 (6 bits), the U error component (6 bits), the Y error component (4 bits) and the VGA output (8 bits) for that pixel. The three error components are latched by latch 45, with 0's added as the least significant bits to provide a full 8 bits per error component, the output of which is the error from the previous pixel and is input to adder 55 and FIFO 47.

FIFO 47 is a variable length FIFO whose length depends upon the image width such that its output is the error from the pixel above the current pixel. This output is latched by latch 51 whose output is the error from the pixel at the upper left diagonal of the current pixel. These two outputs are added together by adder 53 whose output is the other input to adder 55. The output of adder 55 is the total error to be added to the current pixel.

It should be noted that the circuit of FIG. 5 performs the error diffusion on the pixels above, to the left and to the above left of the current pixel rather than to the right, below and below right as discussed above with reference to FIG. 4. However, it should be apparent that the results are exactly the same. Further, the error diffusion discussion above assumed the R, G, B color space and not the Y, U, V color space. However, since the R, G, B color space can be converted to the Y, U, V color space by a simple mathematical operation, the circuit of FIG. 5 can be easily adapted to operate on the R, G, B color space by adding a multiplier prior to the adder 41 which converts R, G, B to Y, U, V, the details of which would be apparent to persons skilled in the art.

We claim:

1. A system for displaying on a video display a pseudo color image formed from a true color image made of plurality of pixels using a 256 color palette comprising:
   a) means for converting the true color image to the pseudo color image pixel by pixel, using said 256 color palette;
   b) means for determining an error value for each color component of a current pixel between its true color value and the pseudo color value;
   c) means for adding predetermined portions of said error value to the pseudo color values of predetermined pixels adjacent to said current pixel to produce a modified pseudo color image;
   d) means for displaying said pseudo color image as modified by said added predetermined portions of said error value
   wherein said 256 color palette is formed from a color space designated Y.I.P. which is determined according to the following matrix operation:

$$\begin{bmatrix} Y \\ I \\ P \end{bmatrix} = \begin{bmatrix} 0.299 & 0.587 & 0.114 \\ 0.596 & -0.274 & -0.322 \\ 0.211 & -0.253 & 0.312 \end{bmatrix} * \begin{bmatrix} R \\ G \\ B \end{bmatrix}$$

wherein said R, G and B represent a red, blue, green color space.

2. The system defined by claim 1 wherein said predetermined portions of said error value are added such that one half of the error value is added to one pixel adjacent to the current pixel; one quarter of the error value is added to a second pixel adjacent to the current pixel, and one quarter of the error value is added to a third pixel adjacent to the current pixel.

3. A method for displaying on a video display a pseudo color image formed from a true color image made of plurality of pixels using a 256 color palette comprising the steps of:
   a) converting the true color image to the pseudo color image pixel by pixel, using said 256 color palette;
   b) determining an error value for each color component of a current pixel between its true color value and the pseudo color value;
   c) adding predetermined portions of said error value to the pseudo color values of predetermined pixels adjacent to said current pixel to produce a modified pseudo color image;
   d) displaying said pseudo color image as modified by said added predetermined portions of said error value;
   wherein said 256 color palette is formed from a color space designated Y.I.P. which is determined according to the following matrix operation:

$$\begin{bmatrix} Y \\ I \\ P \end{bmatrix} = \begin{bmatrix} 0.299 & 0.587 & 0.114 \\ 0.596 & -0.274 & -0.322 \\ 0.211 & -0.253 & 0.312 \end{bmatrix} * \begin{bmatrix} R \\ G \\ B \end{bmatrix}$$

wherein said R, G and B represent a red, blue, green color space.

4. The method defined by claim 3 wherein said predetermined portions of said error value are added such that one half of the error value is added to one pixel adjacent to the current pixel; one quarter of the error value is added to a second pixel adjacent to the current pixel, and one quarter of the error value is added to a third pixel adjacent to the current pixel.

5. The method defined by claim 4 wherein for an index K ranging from 20 to 255, said 256 color palette is defined by a table having values within a RGB color space such that for an index K ranging from K=20 to K=255 the corresponding RGB values are:

| K=20..78 | | | K=79..137 | | | K=138..196 | | | K=197..255 | | |
|---|---|---|---|---|---|---|---|---|---|---|---|
| R | G | B | R | G | B | R | G | B | R | G | B |
| 18 | 33 | 56 | 129 | 41 | 61 | 172 | 120 | 147 | 215 | 199 | 232 |
| 39 | 23 | 56 | 82 | 102 | 141 | 193 | 109 | 147 | 236 | 188 | 232 |
| 60 | 12 | 56 | 103 | 91 | 141 | 130 | 137 | 126 | 255 | 177 | 232 |
| 81 | 1 | 56 | 124 | 80 | 141 | 151 | 126 | 126 | 194 | 205 | 211 |
| 18 | 29 | 35 | 145 | 69 | 141 | 172 | 116 | 126 | 215 | 195 | 211 |
| 39 | 19 | 35 | 82 | 97 | 120 | 193 | 105 | 126 | 236 | 184 | 211 |
| 60 | 8 | 35 | 103 | 87 | 120 | 146 | 166 | 205 | 255 | 173 | 211 |
| 81 | 0 | 35 | 124 | 76 | 120 | 167 | 155 | 205 | 194 | 201 | 190 |
| 18 | 25 | 13 | 145 | 65 | 120 | 188 | 144 | 205 | 215 | 190 | 190 |
| 39 | 14 | 13 | 82 | 93 | 99 | 209 | 133 | 205 | 236 | 180 | 190 |
| 60 | 4 | 13 | 103 | 83 | 99 | 146 | 161 | 184 | 255 | 169 | 190 |
| 81 | 0 | 13 | 124 | 72 | 99 | 167 | 151 | 184 | 210 | 230 | 255 |
| 34 | 54 | 93 | 145 | 61 | 99 | 188 | 140 | 184 | 231 | 219 | 255 |
| 55 | 43 | 93 | 82 | 89 | 77 | 209 | 129 | 184 | 252 | 208 | 255 |
| 76 | 32 | 93 | 103 | 78 | 77 | 146 | 157 | 163 | 255 | 197 | 255 |
| 97 | 21 | 93 | 124 | 68 | 77 | 167 | 147 | 163 | 210 | 225 | 248 |

-continued

| K=20..78 | | | K=79..137 | | | K=138..196 | | | K=197..255 | | |
|---|---|---|---|---|---|---|---|---|---|---|---|
| R | G | B | R | G | B | R | G | B | R | G | B |
| 34 | 49 | 72 | 145 | 57 | 77 | 188 | 136 | 163 | 231 | 215 | 248 |
| 55 | 39 | 72 | 98 | 118 | 157 | 209 | 125 | 163 | 252 | 204 | 248 |
| 76 | 28 | 72 | 119 | 107 | 157 | 146 | 153 | 142 | 255 | 193 | 248 |
| 97 | 17 | 72 | 140 | 96 | 157 | 167 | 142 | 142 | 210 | 221 | 227 |
| 34 | 45 | 51 | 161 | 85 | 157 | 188 | 132 | 142 | 231 | 211 | 227 |
| 55 | 35 | 51 | 98 | 113 | 136 | 209 | 121 | 142 | 252 | 200 | 227 |
| 76 | 24 | 51 | 119 | 103 | 136 | 162 | 182 | 221 | 255 | 189 | 227 |
| 97 | 13 | 51 | 140 | 92 | 136 | 183 | 171 | 221 | 210 | 217 | 206 |
| 34 | 41 | 29 | 161 | 81 | 136 | 204 | 160 | 221 | 231 | 206 | 206 |
| 55 | 30 | 29 | 98 | 109 | 115 | 225 | 149 | 221 | 252 | 196 | 206 |
| 76 | 20 | 29 | 119 | 99 | 115 | 162 | 177 | 200 | 255 | 185 | 206 |
| 97 | 9 | 29 | 140 | 88 | 115 | 183 | 167 | 200 | 226 | 246 | 255 |
| 50 | 70 | 109 | 161 | 77 | 115 | 204 | 156 | 200 | 247 | 235 | 255 |
| 71 | 59 | 109 | 98 | 105 | 93 | 225 | 145 | 200 | 255 | 224 | 255 |
| 92 | 48 | 109 | 119 | 94 | 93 | 162 | 173 | 179 | 255 | 213 | 255 |
| 113 | 37 | 109 | 140 | 84 | 93 | 183 | 163 | 179 | 226 | 241 | 255 |
| 50 | 65 | 88 | 161 | 73 | 93 | 204 | 152 | 179 | 247 | 231 | 255 |
| 71 | 55 | 88 | 114 | 134 | 173 | 225 | 141 | 179 | 255 | 220 | 255 |
| 92 | 44 | 88 | 135 | 123 | 173 | 162 | 169 | 158 | 255 | 209 | 255 |
| 113 | 33 | 88 | 156 | 112 | 173 | 183 | 158 | 158 | 226 | 237 | 243 |
| 50 | 61 | 67 | 177 | 101 | 173 | 204 | 148 | 158 | 247 | 227 | 243 |
| 71 | 51 | 67 | 114 | 129 | 152 | 225 | 137 | 158 | 255 | 216 | 243 |
| 92 | 40 | 67 | 135 | 119 | 152 | 178 | 198 | 237 | 255 | 205 | 243 |
| 113 | 29 | 67 | 156 | 108 | 152 | 199 | 187 | 237 | 226 | 233 | 222 |
| 50 | 57 | 45 | 177 | 97 | 152 | 220 | 176 | 237 | 247 | 222 | 222 |
| 71 | 46 | 45 | 114 | 125 | 131 | 241 | 165 | 237 | 255 | 212 | 222 |
| 92 | 36 | 45 | 135 | 115 | 131 | 178 | 193 | 216 | 255 | 201 | 222 |
| 113 | 25 | 45 | 156 | 104 | 131 | 199 | 183 | 216 | 242 | 255 | 255 |
| 66 | 86 | 125 | 177 | 93 | 131 | 220 | 172 | 216 | 255 | 251 | 255 |
| 87 | 75 | 125 | 114 | 121 | 109 | 241 | 161 | 216 | 255 | 240 | 255 |
| 108 | 64 | 125 | 135 | 110 | 109 | 178 | 189 | 195 | 255 | 229 | 255 |
| 129 | 53 | 125 | 156 | 100 | 110 | 199 | 179 | 195 | 242 | 255 | 255 |
| 66 | 81 | 104 | 177 | 89 | 110 | 220 | 168 | 195 | 255 | 247 | 255 |
| 87 | 71 | 104 | 130 | 150 | 189 | 241 | 157 | 195 | 255 | 236 | 255 |
| 108 | 60 | 104 | 151 | 139 | 189 | 178 | 185 | 174 | 255 | 225 | 255 |
| 129 | 49 | 104 | 172 | 128 | 189 | 199 | 174 | 174 | 242 | 253 | 255 |
| 66 | 77 | 83 | 193 | 117 | 189 | 220 | 164 | 174 | 255 | 243 | 255 |
| 87 | 67 | 83 | 130 | 145 | 168 | 241 | 153 | 174 | 255 | 232 | 255 |
| 108 | 56 | 83 | 151 | 135 | 168 | 194 | 214 | 253 | 255 | 221 | 255 |
| 129 | 45 | 83 | 172 | 124 | 168 | 215 | 203 | 253 | 242 | 249 | 238 |
| 66 | 73 | 61 | 193 | 113 | 168 | 236 | 192 | 253 | 255 | 238 | 238 |
| 87 | 62 | 61 | 130 | 141 | 147 | 255 | 181 | 253 | 255 | 228 | 238 |
| 108 | 52 | 61 | 151 | 131 | 147 | 194 | 209 | 232 | 255 | 217 | 238 |

* * * * *